United States Patent [19]
Inoue et al.

[11] 3,864,670
[45] Feb. 4, 1975

[54] DUAL COMPUTER SYSTEM WITH SIGNAL EXCHANGE SYSTEM

[75] Inventors: Tadanari Inoue; Osamu Tada, Kazutaka, Watanabe, Tokyo, all of Japan

[73] Assignee: Yokogawa Electric Works, Ltd., Tokyo, Japan

[22] Filed: Feb. 22, 1973

[21] Appl. No.: 334,857

Related U.S. Application Data

[63] Continuation-in-part of Ser. No. 182,489, Sept. 21, 1971, abandoned.

[52] U.S. Cl. .......................................... 340/172.5
[51] Int. Cl. ......................... G06f 15/16, G06f 15/20
[58] Field of Search ................................ 340/172.5

[56] References Cited

UNITED STATES PATENTS

| | | | |
|---|---|---|---|
| 3,252,149 | 5/1966 | Weida et al. | 340/172.5 |
| 3,303,474 | 2/1967 | Moore et al. | 340/172.5 |
| 3,377,623 | 4/1968 | Reut et al. | 340/172.5 |
| 3,471,686 | 10/1969 | Connell | 235/153 AE |
| 3,517,174 | 6/1970 | Ossfeldt | 340/172.5 |
| 3,562,716 | 2/1971 | Fontaine et al. | 340/172.5 |
| 3,636,331 | 1/1972 | Amrehn et al. | 340/172.5 |

*Primary Examiner*—Harvey E. Springborn
*Attorney, Agent, or Firm*—Bryan, Parmelee, Johnson & Bollinger

[57] ABSTRACT

A dual computer system of the type comprising two simultaneously operating central processors is disclosed. The two central processors are connected to each other for processing a breakdown cycle by way of an memory bus exchanger (MBEX) for switching connections between two memory buses, a data bus exchanger (DBEX) for switching connections between the input/output signal lines of the two central processors (CP) and the data bus line, and a dual control unit (DCU) for monitoring the two central processors and controlling the MBEX and the DBEX and thus integrally controlling the dual system.

The dual computer system operates through a breakdown cycle utilizing the following four modes:

1. Dual Mode: In this mode the two CP's are fully sychronized and the output signals of the two CP's or the outputs of registers or the like are monitored through a check circuit located in the DCU. One of the CP's is responsible for input/output operations and the other CP remains a standby.

2. Abnormal Mode: This mode results when a discoincidence is detected in the outputs being monitored by the DCU. The input/output operations of the CP's are halted by the DBEX until the failed CP is identified and isolated from the system.

3. Single Mode: In this mode only the normal CP is in operation. The normal CP reads the memory of the failed one through the MBEX for use in diagnosing the failure, and the failed CP is repaired.

4. Preparation Mode: In this mode the memory and register contents of the repaired CP are equalized through the MBEX with those of the normally functioning CP, and the two CP's are synchronized to allow the system to be returned to the dual mode.

In the event of failure of one of the CP's, the normal CP assumes the single mode of operation immediately after a short halt of system operation in the abnormal mode. The failed CP is repaired, the memory and register contents of the failed CP are equalized with those of the other CP remaining on-line, and thus the dual mode is restored without substantially disturbing the flow of system operation. This enhances system reliability.

8 Claims, 22 Drawing Figures

FIG. 7B CONTROL SIGNALS $S_{11} = F_{co} \cdot (MAO_2 \cdot SM + PM)$ $S_{12} = F_{co} \cdot MAO_2 \cdot SM$ $S_{13} = F_{co} \cdot PM$ $S_{14} = F_{co} \cdot (MAO_2 \cdot SM + PM) \cdot W_{c2} + \overline{F_{co}} \cdot MAO_1 \cdot SM \cdot R_{c1}$ $S_{15} = F_{co} \cdot (MAO_2 \cdot SM + PM)$ $S_{16} = F_{co} \cdot PM$ $S_{17} = F_{co} \cdot SM$ $S_{21} = \overline{F_{co}} \cdot (MAO_1 \cdot SM + PM)$ $S_{22} = \overline{F_{co}} \cdot MAO_1 \cdot SM$ $S_{23} = \overline{F_{co}} \cdot PM$ $S_{24} = \overline{F_{co}} \cdot (MAO_1 \cdot SM + PM) \cdot W_{c1} + F_{co} \cdot MAO_2 \cdot SM \cdot R_{c2}$ $S_{25} = \overline{F_{co}} \cdot (MAO_1 \cdot SM + PM)$ $S_{26} = \overline{F_{co}} \cdot PM$ $S_{27} = \overline{F_{co}} \cdot SM$

FIG. 8A

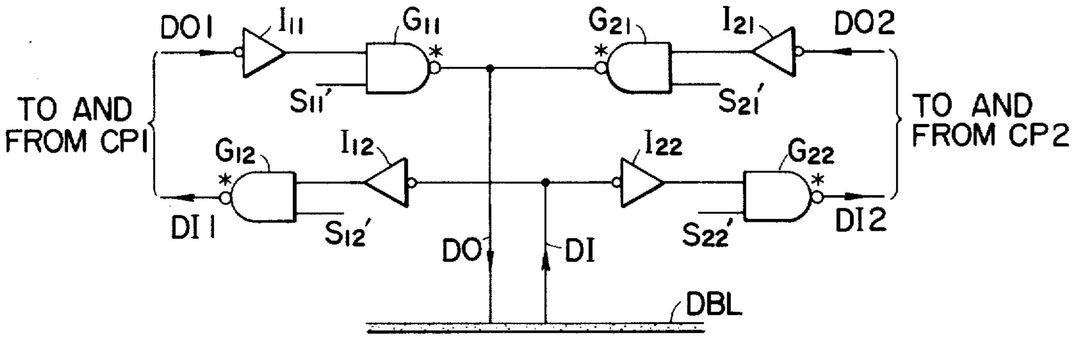

FIG. 8B CONTROL SIGNALS $S_{11}' = \overline{AM} \cdot \overline{F_{co}}$ $S_{12}' = \overline{AM + SM \cdot F_{co}}$ $S_{21}' = \overline{AM} \cdot F_{co}$ $S_{22}' = \overline{AM + SM \cdot \overline{F_{co}}}$

DUAL COMPUTER SYSTEM WITH SIGNAL EXCHANGE SYSTEM

CROSS-REFERENCE TO RELATED APPLICATION

This application is a continuation-in-part of application Ser. No. 182,489, filed Sept. 21, 1971 and now abandoned.

BACKGROUND OF THE INVENTION

The present invention relates to high reliability dual computer systems of the type comprising two central processors synchronized for parallel operation to establish greater operating reliability than in conventional systems comprising one central processor.

The term "central processor" (also abbreviated as CP) as used herein means a device which compriss an arithmetic and control unit (ACU), a main memory unit (MMU), and a memory bus (MB) which connects between the ACU and the MMU. A plurality of input-/output devices (IOD) are connected to the CP by way of data bus lines (DBL). The CP executes in sequence the instructions stored in its memory.

Dual computers have been incorporated into computer systems to achieve higher system reliability, as shown in the following U.S. Pats. Nos.: Moore 3,303,474; Ossfeldt 3,517,174; Alterman 3,409,877; Weida 3,252,149; Rent 3,377,623; Lovell 3,444,528; Connell 3,471,686; Avsan 3,503,048; and Fontaine 3,562,716. As disclosed by these patents, a typical dual computer system has two computers in parallel. The outputs of the two computers are compared with each other. Any discoincidence detected in the comparison shows that one of the computers is failing. The failed computer is discriminated by suitable procedures such as, for example, by executing a diagnostic program or through an error check function. The failed computer is isolated from the system, and the other computer remains in operation for the system. At some later time, the isolated computer, when repaired, is to rejoin the system.

Typically, however, the special arrangements such as programming that have been employed for restoration of the failed computer and handling of the computer joint operation, have been incapable of dealing with computers providing high speed real-time processing wherein computer memory contents are constantly changing.

SUMMARY OF THE INVENTION

Objects of the present invention are to provide, for coupling tandem high speed computers for redundant processing of data, a system in which, in the event of failure in one of the computers, the failed computer can be located and automatically isolated, in which the viable computer can be used to assist in repairing the breakdown, and in which the memory contents of the failed computer can be brought up to date in preparation for restoration of parallel operation.

According to the invention, dual computers are interconnected by means of a signal exchange system, one portion of which is a data bus exchange means and another of which is a memory bus exchange means, the two portions being controlled by dual control means monitoring an output of the two computers. The data bus exchange means responds to a discoincidence in said monitored output to switch from a normal mode to an abnormal mode, thereby to enable the faulty computer to be identified by a diagnostic program, followed by switching into a single mode to connect only the viable computer's input and output with the system's input and output lines. While the repaired computer is being restored, the data bus exchange means connects the processing unit input of the computer being restored to the input line to provide duplicate input data.

The memory exchange means links the memory buses of the two computers, and has a first condition in which the two memories are disconnected and operate independently, the first condition occurring both while the two computers are in dual mode and in abnormal mode, third condition which connects the memory buses of the two computers and permits the viable computer to investigate the memory of the failed computer during its free time to diagnose the failure without altering the memory of the normal computer, and second condition which connects the memory abuses of the two computers to cause every read and write command of the viable computer to be translated into a write command in the repaired computer so that as the viable computer makes access in the addresses of its memory, the repaired computer memory contents are made coincident therewith.

Thus, in the event of failure in one computer, the signal exchange system of this invention makes it readily possible to discover the failed side of the system, to isolate and repair the failed computer, to equalize the memory contents, and to restore the repaired computer to parallel operation, for increased system reliability.

These and other features, objects and novel aspects of the invention will be described in or be apparent from the following description of the preferred embodiment.

DESCRIPTION OF THE DRAWINGS

FIG. 7B sets forth the logic conditions for control signals applied in FIG. 7A;

FIG. 8A is a logic diagram of the DBEX with one bit of data;

FIG. 8B sets forth the logic conditions for control signals applied in FIG 8A;

DESCRIPTION OF THE PREFERRED EMBODIMENT

Figure 1:
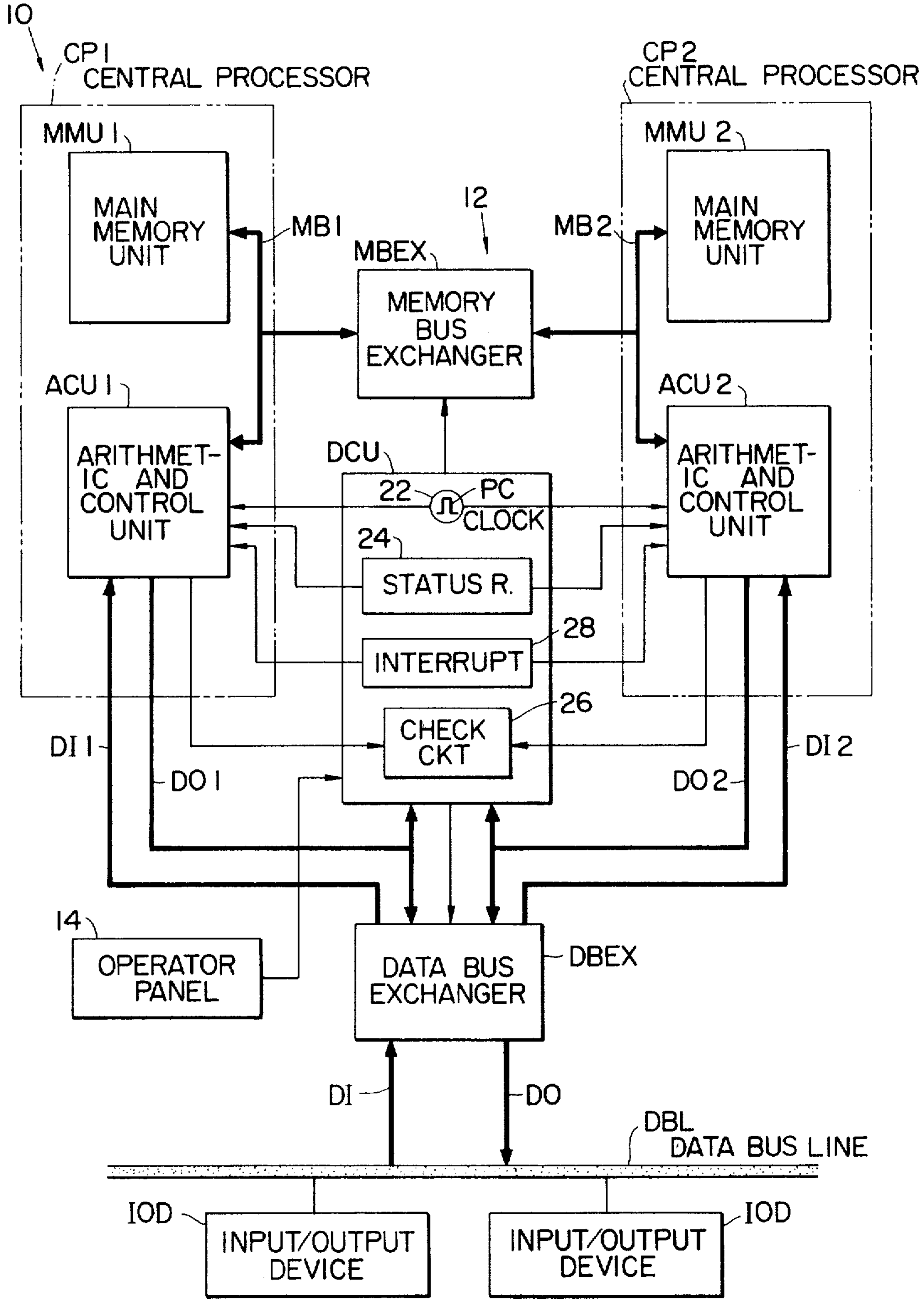
FIG. 1 is a block diagram of a dual computer system according to the invention.

Referring to FIG. 1, the present invention relates to a dual computer system 10 of the type in which two central processors CP1 and CP2 are used for synchronous parallel operation, executing the same functions, and are interconnected by a signal exchange means 12 to deal with breakdown of one central processor, whereby greater system reliability is realized than in the conventional system comprising one central processor.

Before describing signal exchanger means 12, a general description of a central processor CP of the type used for central processors CP1 and CP2 will be helpful. As used in this specification, the term central processor or CP refers to a conventional digital computer of stored program type comprising an arithmetic and control unit (sometimes abbreviated as ACU) for arithmetic and input/output operations, a main memory unit (MMU) in which programs and data are stored, and a memory bus (MB) for conveying data between the ACU and MMU. For the sake of explanatory simplicity the MMU will be described as a magnetic core memory. Instead of this memory, however, other memory elements such as integrated circuits may be used.

Figure 4:
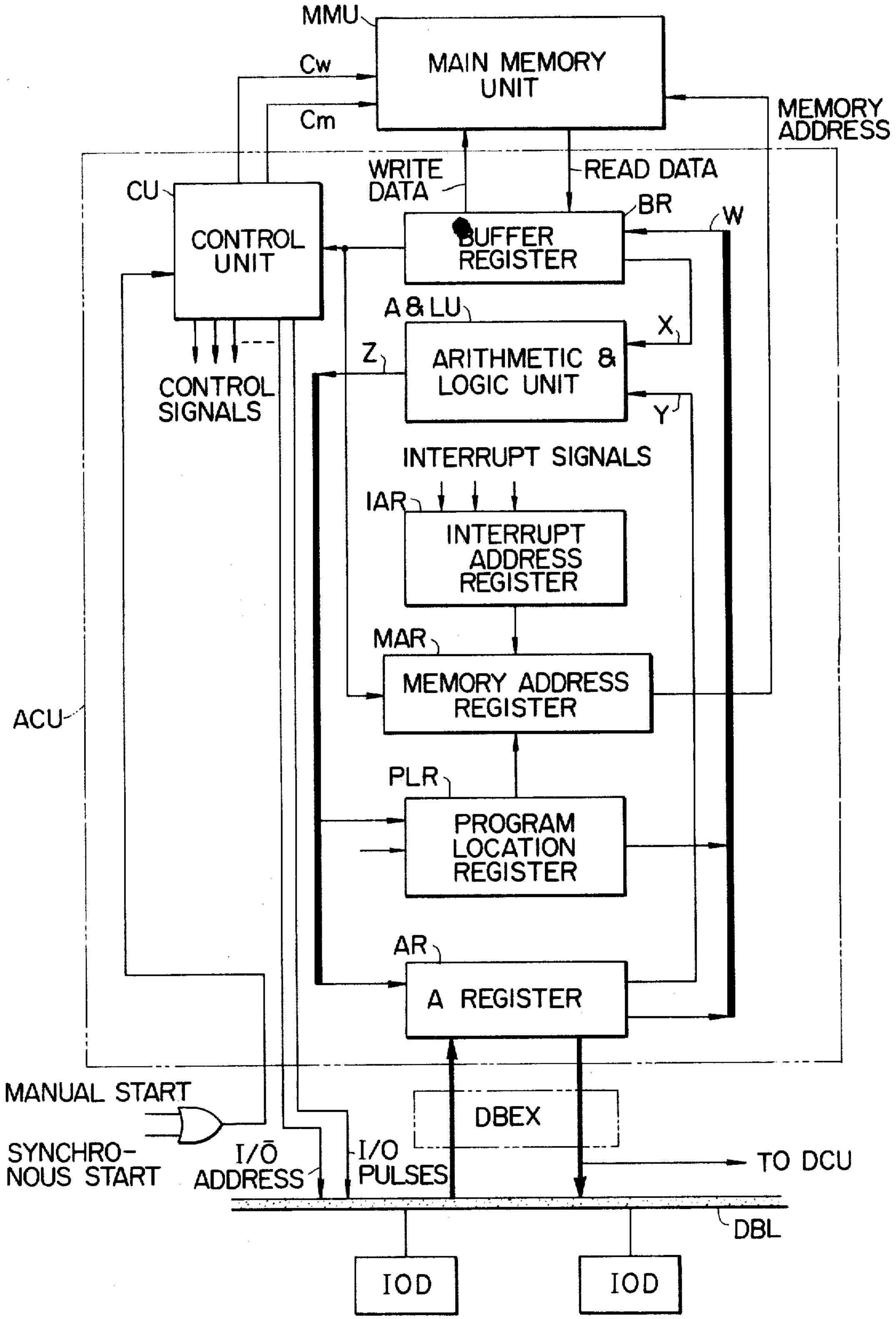
FIG. 4 is a block diagram showing major components of the CP.

FIG. 4 is a block diagram of a CP comprising one ACU and one MMU. The ACU reads the instructions stored in the MMU, decodes the read instruction, and executes its functions according to instruction.

1. Description of the MMU

The MMU stores programs and data. It is usually of magnetic core type, and will be described as such herein. The magnetic core is capable of storing the logic values "1" and "0" depending on the state of magnetization. Once its content is read out, the state of magnetization turns into "0." When its state changes from "1" to "0," an output voltage appears. The state change from "0" to "0" causes the magnetic core memory to generate no output. This makes it possible to detect the "1" or "0" states. Once its content is read out, the stored data is lost, or the same data should be rewritten into place. Hence the magnetic core memory needs two cycles: the read cycle for reading data, and the write cycle for rewriting the data. In the read cycle, the stored data is cleared. In the write cycle, new data is written. Read and write operations are performed always in the read cycle (Rc) and the write cycle (Wc). The combination is the two cycles is referred to as one memory cycle, or, briefly, one cycle.

Figure 5:
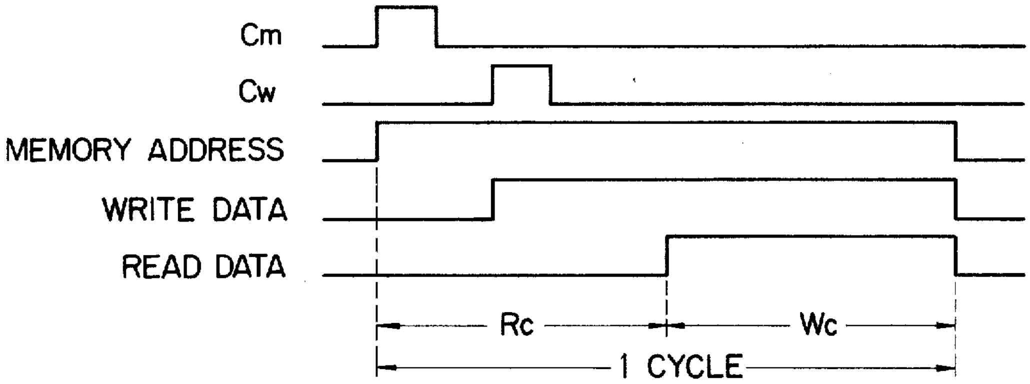
FIG. 5 is a graph comparing the timing of signals used in the memory bus.

FIG. 5 is a time chart illustrating the operation of the MMU. The symbol Cm denotes a pulse signal which commands the MMU for read/write operation, and Cw a pulse signal which commands the MMu for write operation. The signal labelled "memory address" indicates the address of data in the MMU. This signal is made up of n+bits, MAO, MAl,. . . , MAn. The most significant bit MAO assumes the "1" state in this dual system only when one of the ACU's operates on the memory of the other CP, e.g., when ACU1 operates on MMU2, or ACU2 operates on MMU1. When either ACU operates on its own MMU, MAO assumes the "0" state. Further aspects of the most significant bit MAO will be described below in relation to the operation of signal exchange means 12.

As shown in FIG. 5, the read operation is initiated at the beginning of the read cycle Rc, and the read data is finalized by the time write cycle Wc begins. Then in the write cycle Wc, the data is rewritten. If the read data contains an instruction, this instruction is decoded in the write cycle. If the data is not an instruction, some arithmetic operation, such as summation, is performed on the data in the write cycle.

The cycle during which an instruction is read out is referred to as fetch cycle. The period in which an instruction is executed is referred to as execution cycle. An execution cycle does not always accompany a read/write operation at the memory.

2. Description of the ACU

The ACU comprises various registers described below, an arithmetic and logic unit (A & LU), and a control unit (CU) as shown in FIG. 4. The A & LU performs four rules of arithmetic operations and logic operations, and the control unit generates signals for controlling the registers and the gates of A & LU.

Referring to FIG. 4, PLR is an abbreviation for 'program location register' which shows the address of the next instruction. When an instruction is read out, the PLR increases its content by 1. Thus the instructions are read out and executed in sequence. When an interrupt is generated, an instruction is taken out from the address corresponding to the interrupt. The interrupt address register (IAR) holds the address at the occurrence of an interrupt. Usually, since a plurality of interrupt levels are provided, different addresses are generated according to the individual interrupt levels.

MAR is a memory address register which holds the memory address. In the beginning of the fetch cycle, the content of the PLR is set in the MAR normally, or the content of the IAR is set in the MAR in the event of an interrupt.

AR is abbreviated from 'A register' which serves as the main arithmetic register.

BR is a buffer register which temporarily holds the data exchanged between the ACU and the MMU. The instruction read out from the memory is set in the BR. The instruction format is composed of two parts; the operation part which indicates the kind of instruction, and the address part which gives address information. The former part is supplied to the control unit where it is decoded to allow the control unit to generate various control signals. The latter part is transferred to the MAR to designate the address of the operand.

Taking the ADD instruction as an example, execution of the instruction is as follows. The ADD instruction is intended to cause the AR to add to its content the operand indicated in the address part of the instruction. In the fetch cycle, the ADD instruction is set in the BR. The instruction is decoded, its address part is set in the MAR in the next execution cycle, and the operand is set in the BR. The output gate of the AR is opened, and the contents of the two registers AR and BR are supplied to the A & LU through the X-bus and the Y-bus respectively. The A & LU executes the summation operation and transfers the summed result to the AR through the Z-bus. In this manner the ADD instruction is executed.

Input/output instructions between the ACU and input/output devices (IOD) are executed in the following manner. The data exchange between the ACU and the input/output devices is performed by way of the AR, as shown in FIG. 4. The input/output operation includes the data output to the input/output device (IOD) from the AR, as well as the data input to the AR from the IOD. Hence there are provided two input/output instructions as follows.

1. OTA (output from AR)
2. INA (input to AR)

Either instruction has the address of the particular IOD which is to exchange data with the CP. The OTA instruction instructs the transfer of the contents of AR to the designated IOD. At the same time a pulse signal is supplied to this IOD.

The INA instruction is for the transfer of input data from the IOD to the AR.

Figure 6:
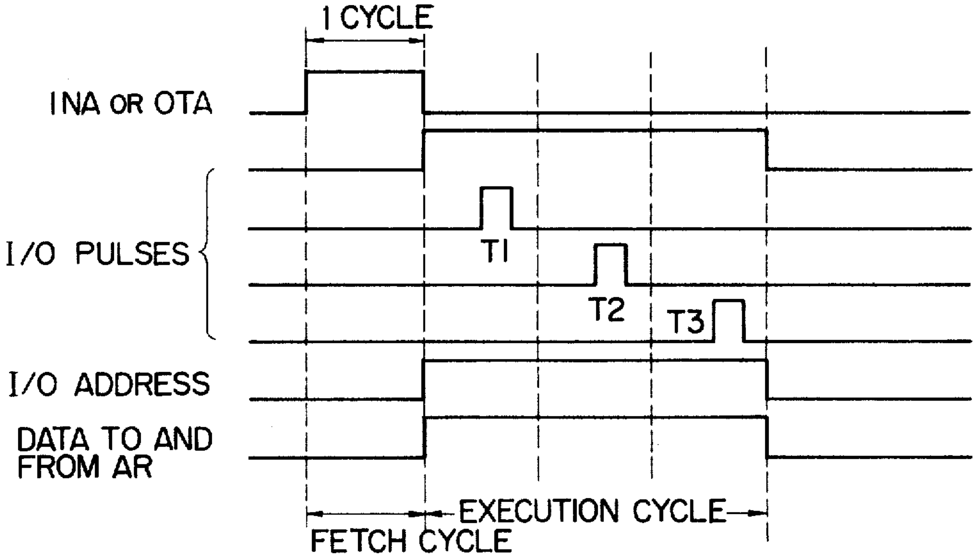
FIG. 6 is a graph comparing the timing of signals used in the data bus.

FIG. 6 is a time chart showing the flow of signals exchanged between the CP and IOD when the input/output instruction is executed. The group of lines carrying these signals is called the data bus line (DBL), through which the individual input/output devices are connected to the CP.

In addition to the MBEX, DBEX and DCU of signal exchange means 12, dual computer system 10 preferably incorporates the following capabilities in each of the CP's.

1. The capability of executing an instruction from a specific address when an interrupt signal is generated during operation or halt.
2. The capability of causing the MMU to exchange data with the registers of ACU, excepting with the MAR and BR.
3. The capability of allowing the DCU to receive the output for discoincidence detection.
4. The capability of allowing one bit (e.g., MAO) of the memory address data (i.e., the MAR output) to be used for designating the memory address.
5. The capability of receiving an externally supplied basic clock pulse for synchronous operation.

These capabilities can easily be added to usual central processors, which facilitates employment of the concept of the dual computer system of this invention.

3. The Dual System and Its Devices (MBEX, DBEX and DCU)

FIG. 1 illustrates in block form one dual system 10 of this invention, which comprises two central processors CP1 and CP2 operated in parallel and having arithmetic and control units ACU1 and ACU2 and main memory units MMU1 and MMU2. The two CP's are connected to each other by way of a memory bus exchanger (MBEX), a data bus exchanger (DBEX) and a dual control unit (DCU). The DCU plays a central role in the dual computer system and comprises the following elements:

1. control circuits 20 (see FIG. 9B) for controlling the MBEX and DBEX
2. a clock circuit 22 for synchronizing the two CP's
3. a circuit 26 for comparing the outputs of the two CP's and for detecting discoincidence
4. a circuit 28 for generating an interrupt signal to the CP's and a status register 24 to show the cause of the interrupt
5. a flip-flop circuit 30 (see FIG. 9B) for indicating which CP is on service
6. a circuit 32 (see FIG. 9B) for generating the four different modes of operation of the signal exchange means 12.

As shown in FIG. 1, ACU1 and ACU2 supply their input/output signals and major register signals to the DCU. In return, the DCU supplies each CP with an interrupt signal and status data which shows the cause of the interrupt. The DCU also supplies control signals to the MBEX and DBEX. The operator also may send control signals to the DCU through a control panel 14.

The dual system 10 is arranged to assume various modes of operation during normal and breakdown conditions. The invention uses four modes, the dual mode (DM), the abnormal mode (AM), the single mode (SM), and the preparations mode (PM). In the DM, the two CP's are synchronized and in normal operation. In the AM, the system halts because discoincidence between the two CP's has been detected. During the AM the failed CP is identified. The failed CP is isolated from the system in the SM, with the normal CP being responsible for system operation. In the PM, the memory and register contents of the failed CP are equalized with those of the other CP, to allow the failed CP to return to synchronous operation in the dual system upon completion of repair.

Figure 2:
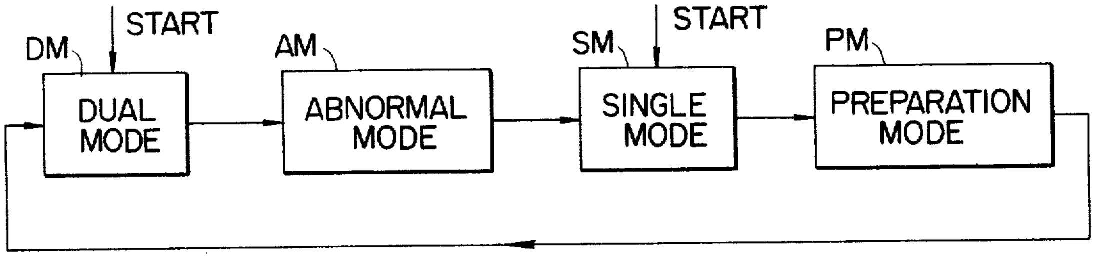
FIG. 2 is a block diagram showing the sequence of modes in the dual computer system of FIG. 1.

FIG. 2 illustrates the sequential transition of these modes. The individual modes are indicated on flip-flops in the DCU, as described below with reference to FIG. 9B.

FIGS. 3A through 3D show the status of the MBEX and DBEX in each mode. The MBEX and DBEX both comprise switching circuits in the form of, e.g., relays or semiconductor circuits.

Figure 3A:
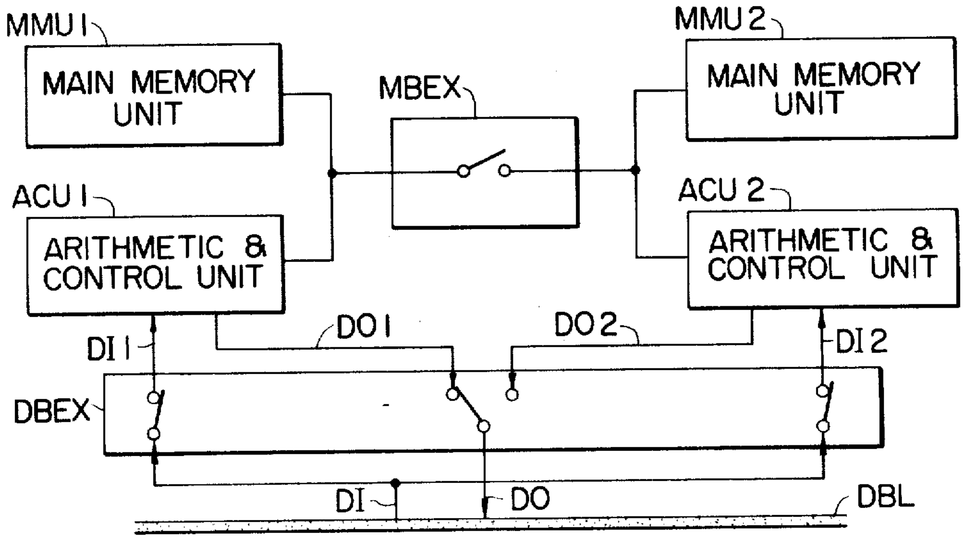
FIGS. 3A through 3D are block diagrams showing connections effected by the MBEX and the DBEX in each mode in response to control signals from the DCU.

Briefly, the switching effected by DBEX and MBEX is as follows. The dual mode of operation DM, illustrated in FIG. 3A, is used in normal operation with both of the tandem computers functioning normally. In this mode, DBEX connects the data inputs DI1 and DI2 of both processing units to the input line DI from the data bus line DBL and consequently the two computers receive the same input and function identically. Only one data output DO1, that of CP1, is connected by DBEX to the output line DO leading to DB1. The dual control unit DCU compares output signals of the two computers, detecting coincidence therebetween. As long as the dual control unit DCU confirms that coincidence exists, the two computers remain in the dual mode. The MBEX, as shown in FIG. 3A, disconnects the two memory buses so that independent computer operation ensues.

Figure 3B:
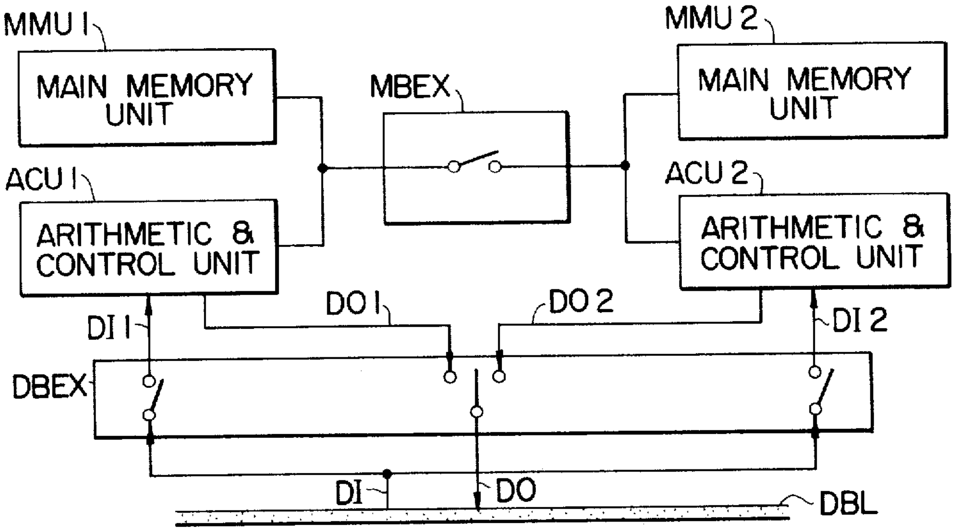

Whenever discoincidence between the output signals of the two computers is detected by DCU, the signal exchange system switches to the abnormal mode AM shown in FIG. 3B. Discoincidence signifies that one of the two computers has failed, but is does not indicate which has failed. In response to the failure signal from DCU, the device DBEX isolates the computers by disconnecting the inputs and outputs of both computers from the input and output lines to the data bus line DBL. Simultaneously, the two computers halt execution of their existing programs and institute their individual fault diagnostic programs. In this abnormal mode, during execution of the diagnostic programs, the memory bus exchange device MBEX maintains the two computers disconnected.

Figure 3C:
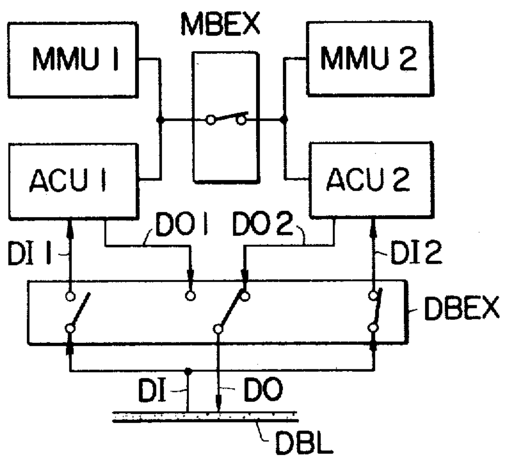

After the identification of the failed computer has been made by the diagnostic program, the signal exchange system transfers to the single mode SM, illustrated in FIG. 3C. In the single mode, DBEX connects the viable computer, here assumed to be the right hand computer CP2, with the input and output lines from the DBL, and disconnects the other computer CP1 therefrom. Accordingly, the viable computer continues to exchange data with external input output devices while the failed computer is repaired for later resumption of service.

The memory bus exchange device MBEX connects the memory buses MB1 and MB2 of the two computers together in a manner to be described below, the interconnection enabling the viable computer to interrogate and retrieve the memory of the failed computer to assist in diagnosing the fault to speed repair.

Figure 3D:
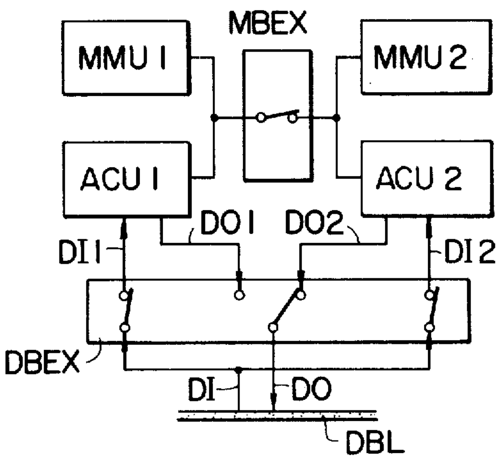

When the repaired computer is ready to resume operation, the single mode SM is transferred to the preparation mode PM, shown in FIG. 3D, by means of a manual button. In the preparation mode, DBEX connects the data input lines of both computers to the data input line DI from DBL. The data output line DO of DBL is connected to the data output line DO2 of the operating computer, in this case computer CP2. In the preparation mode PM, memory bus exchange device MBEX is arranged, as described below, to alter the contents of the repaired computer'memory to coincide with the memory contents of the functioning computer CP2. Upon completion of this equalizing procedure, the two computers can be again synchronously operated in parallel in the dual mode DM. To accomplish the memory transfer, the memory bus exchange device MBEX is connected between memory buses MB1 and MB2.

The switching operations of DCU, DBEX and MBEX are accomplished with the switching circuits illustrated in FIGS. 7-9 and described below.

Figure 9A:
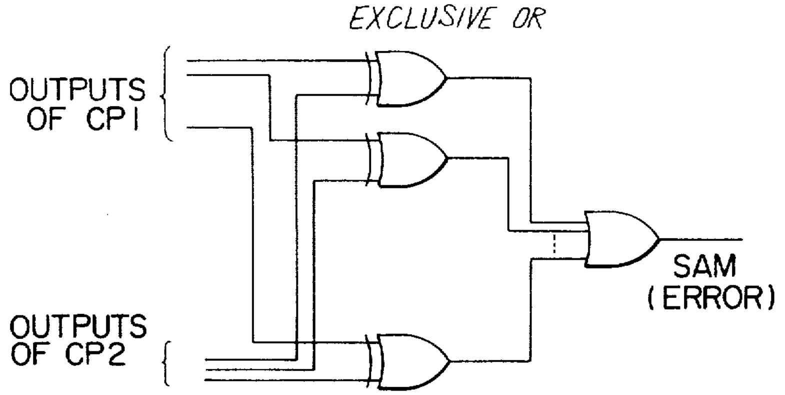
FIGS. 9A and 9B are logic diagrams of the DCU.
Figure 9B:
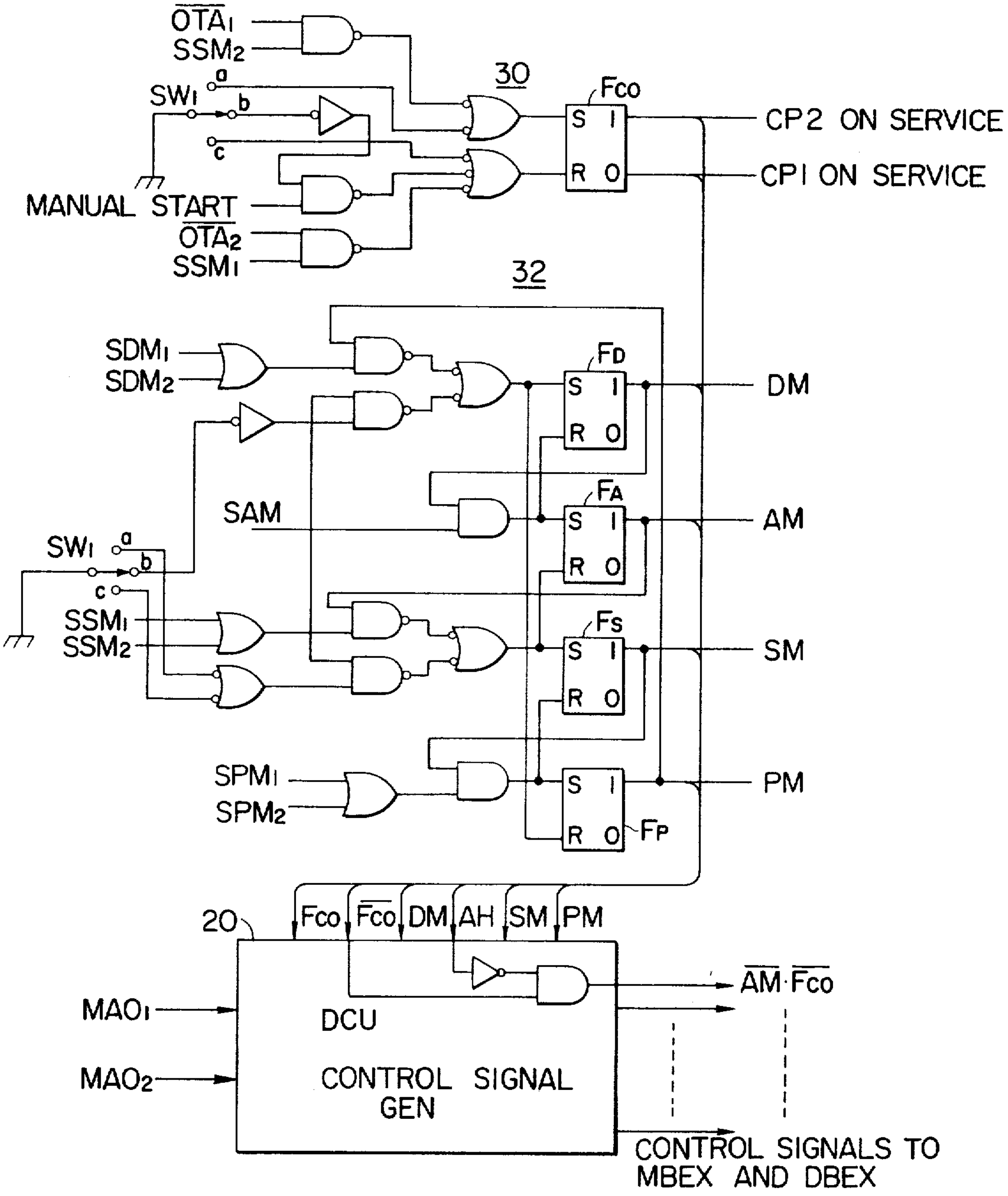

Referring to FIG. 9B, illustrating a portion of the dual control unit DCU, the symbols $F_D$, $F_A$, $F_S$ and $F_P$ represent flip-flops in the circuit 32 which indicates the individual modes. The manual start signal (from operator panel 14, shown in FIG. 1) is a pulse signal which sets the flip-flops to the initial state, and starts the two CP's under the following conditions. This pulse signal is supplied also to the control unit CU of each of the two CP's, as shown in FIG. 4. The switch SW1 designates the initial mode, DM or SM in which the system is to start. When the switch is in position *b*, this indicates the system is to start in the dual mode DM. The positions *a* or *c* indicate SM is to be the initial mode. When the memory and register contents of one CP are the same as those of the other CP, the SM is the initial mode. In the SM, with the switch SW1 in the position *a*, the flip-flop Fco is set to "1" and, therefore, the CP2 is responsible for the system operation. When the SW1 is in the position *c*, the Fco is set to "0". Under this condition, the CP1 is responsible for the system operation.

The flip-flop F*co* thus indicates which CP is actually executing input/output operations or is "on service." For example, in FIG. 9B, when the mode is the DM to start with, the F*co* is set to "0" and the CP1 is on service. Under the DM mode, of course, either CP may be designated to be on service.

In the circuit of FIG 9B, pulse signals SDM (set to DM), SSM (set to SM), and SPM (set to PM), are generated by the OTA instruction from the CP. Switching of flip-flops and changing of modes are executed by these signals. These operations are performed by the OTA instruction because it is desired to avoid switching the flip-flop F*co* or changing the modes during execution of an instruction for input/output operations with IOD's or during read/write operations at the memory. As explained before, read/write operations at the memory are not performed during execution of the OTA instruction. The signals and circuit symbols with suffix 1 are associated with CP1, while those with suffix 2 are associated with CP2. The pulse signals SDM, SSM and SPM have the same pulse width as the pulse T3 of FIG 6.

The SAM signal is a pulse signal supplied from the error detecting circuit 26 contained in the DCU and shown in FIG. 9A. The error detecting circuit comprises exclusive OR circuits connected as shown in FIG. 9A, and monitors selected output signals of the two CP's. When any discoincidence is encountered during the monitoring, the SAM signal assumes a "1" state. As shown in FIG. 9B, when the SAM is "1" in the dual mode DM, the flip-flop $F_A$ is set, $F_D$ is reset, and the DM is switched to the AM. 9

The outputs of the F*co* and the mode signal flip-flops control the MBEX and DBEX through a control signal generator 20 shown in FIG. 9B. This control signal generator contains conventional logic elements to generate signals used by MBEX and DBEX to effect the above-described switching, such as the illustrated signal $\overline{Fco\cdot AM}$. Instead of this generator, other circuits having an appropriate combination of AND and OR circuits may be used to provide the various control signals for MBEX and DBEX, set forth below with reference to FIGS. 7B and 8B.

Figure 7A:
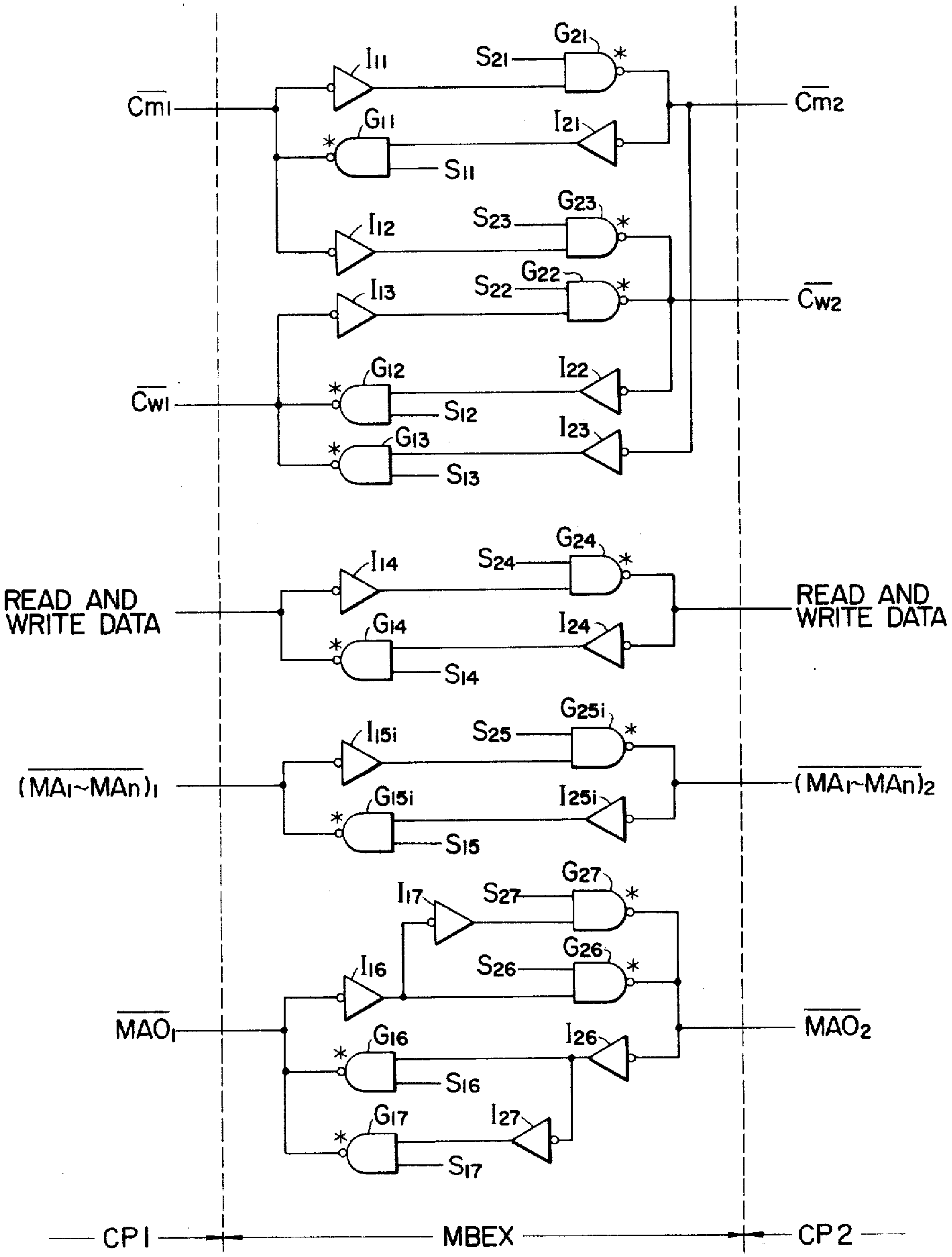
FIG. 7A is a logic diagram of the MBEX with one bit of memory data.

FIG. 7A illustrates the logic elements of MBEX. This circuit is arranged symmetrically with respect to the center line (a dot-dash line). The symbols of the circuit elements associated with CP1 bear the suffix 1, and those associated with CP2 bear the suffix 2. NAND circuit terminals marked with an asterisk (*) represent the open collector output terminal. Thus a plurality of wired OR logics using NAND circuits are made available. The signals S11 through S17 and S21 through S27 applied to the circuit are set forth in FIG 7B.

FIG. 8A is a similar diagram of the logic elements of the DBEX, and the signals applied to the circuit are set forth in FIG. 8B The functions of each of the modes of dual system 10 will be described below in connection with the logical operation of the MBEX and DBEX as illustrated in FIGS. 7A and 8A.

1. Dual Mode

Under this mode, the dual computer system 10 remains in normal operation. The two CP's are isolated from each other by the MBEX and hence one of the CP's will not read or write data from or into the memory of the other CP. The output of the CP which is on service is supplied to the DBL through the DBEX, and the input signal from the DBL is supplied to the both CP's through the DBEX.

As shown in FIG. 1, the two CP's are fully synchronized by a single clock pulse PC supplied from a clock 22 in the DCU, and the output signals of the two CP's are always monitored by the discoincidence detecting circuit 26 (FIG. 9A) contained in the DCU.

More specifically, the operations of the MBEX and DBEX in dual mode DM are as described below.

In the MBEX of FIG. 7A, the CP1 is on service (F*co* = "0") and the mode is DM. Under this condition, all the signals $S_{11}$ through $S_{17}$ and $S_{21}$ through $S_{27}$ are "0." (See FIG. 7B). Accordingly, all the gates are not active and the memory buses of the two CP's are perfectly isolated from each other.

In the DBEX of FIG. 8A, the condition $\overline{AM}\cdot Fco$ = "1" is satisfied. Under this condition, the gate $G_{11}$ is active. However, since $\overline{AM} \cdot Fco$ = "0," the gate $G_{21}$ is not active. As a result, the output of the CP1 is supplied on output line DO to the DBL. Since the conditions for both $S'_{12}$ and $S'_{22}$ to be "1" are met, the gates $G_{12}$ and $G_{22}$ are active, and the input on line DI from DBL is supplied to both CP's on lines DI1 and DI2.

Under this condition, the MBEX and DBEX are in operation as shown in FIG. 3A.

2. Abnormal Mode

This mode results when discoincidence is detected by the discoincidence detecting circuit (FIG. 9A) and the SAM signal assumes a "1" state. Both outputs of the CP's are inhibited by the DBEX, and no input/output operations are performed.

In the MBEX of FIG. 7A, all the signal conditions at $S_{11}$ through $S_{17}$ and $S_{21}$ through $S_{27}$ do not hold, and the gates $G_{11}$ through $G_{17}$ and $G_{21}$ through $G_{27}$ are not active.

In the DBEX of FIG. 8A, the conditions at $S'_{11}$ $S'_{12}$, $S'_{21}$ and $S'_{22}$ are not satisfied, and all the gates are not active. As a result, all input/output signals are disconnected and no input/output operations are performed.

Under this condition, the states of the MBEX and DBEX are as shown in FIG. 3B.

During the abnormal mode, because the identity of the failed CP is unknown although discoincidence has been detected, each CP independently executes a conventional diagnostic program to check for the failure.

Figures 12A, 12B, 12C:
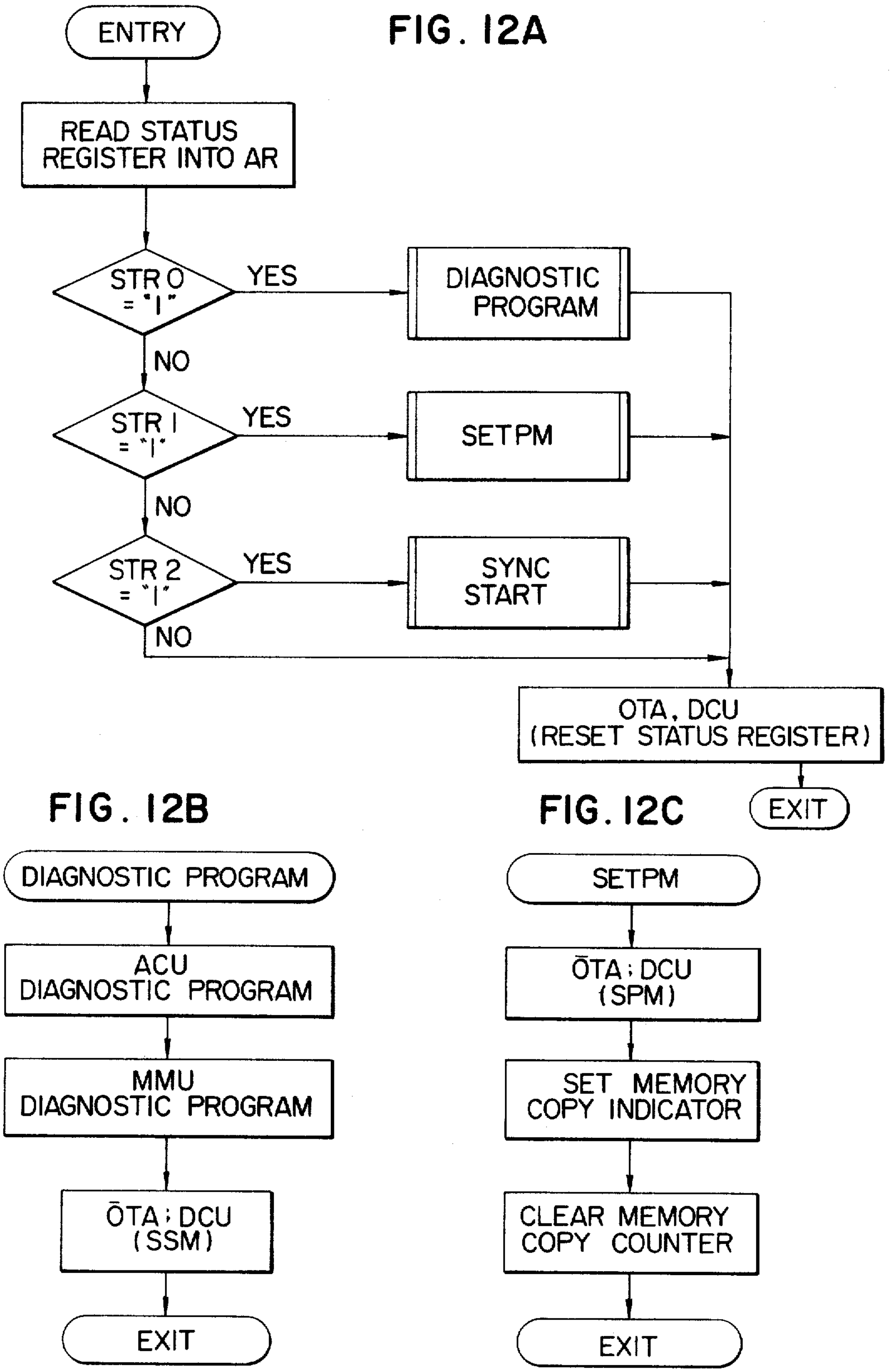
FIGS. 12A through 12E are flow diagrams of programs used for controlling the dual computer system of the invention.

FIGS. 12A and 12B show the steps entailed in executing such a diagnostic program.

When the SAM signal is "1," indicating discoincidence, this signal sets the flip-flop STRO and DCU's status register 24 (shown in FIG. 10) to generate an interrupt signal to the CP's. The two CP's then halt execution of the existing programs. The CP's read the contents of the status register 24 in the DCU, and as a result of reading the "1" in STRO know that the cause of the interrupt arose from a detected discoincidence. As FIG. 12A shows, upon this condition the CP's immediately start executing the diagnostic program. This program is executed at the highest priority interrupt level (see FIG. 11), and in the program various instructions are executed. The results of the instruction execution are compared with predetermined correct data. If this comparison results in a discoincidence, the CP detecting the discoincidence stops. The CP which has duly passed the diagnostic program generates an SSM signal by the OTA instruction, and the control mode is switched to the SM by the DCU (FIG. 9B).

During execution of the diagnostic program, the computer's programs and input/output operations are not executed. The period of execution for the diagnostic program can easily be made shorter than 10 ms and this delay does not affect system operation significantly.

As shown in FIG. 9B, the flip-flop Fs is set to "1" by the SSM signal and at the same time, the flip-flop $F_A$ is reset to "0" whereby the control mode is switched to the SM. When the SSM2 is in a "1" state and SSM1 is in a "0" state, the flip-flop *Fco* assumes a "1" state and CP2 is on service. On the other hand, when the SSM1 is in a "1" state and the SSM2 is in a "0" state, *Fco* is reset to "0" and CP1 is on service.

When both CP's are found viable (as a result, e.g., of a transient discoincidence detected in the DCU), the mode transfers to SM, with *Fco* unchanged, because the two CP's concurrently generate the SSM signal by the OTA instruction, to cause $\overline{OTA1} \cdot SSM2$ and $\overline{OTA2} \cdot SSM1$ to assume a "0" state, as shown in FIG. 9B.

3. Single Mode

Under this mode, only one CP is responsible for input/output operations. The failed CP is isolated from the system for repair. The CP in operation reads the memory of the failed CP for use in locating the failed point.

Assume that CP1 is failing and CP2 is normal. In this state, to read the memory from the CP1, it is necessary to turn MAO2 into "1," as described above under the heading "Description of the MMU." In the MBEX of FIGS. 7A and 7B, when $MAO2$ = "1," then $Fco$ = "1" and therefore $S_{11} = S_{12}$ = "1," and $S_{13}$ = "0," $S_{14} = Wc_2$, $S_{15}$ = "1," $S_{16}$ = "0," $S_{17}$ = "1," $S_{21} = S_{22} = S_{23} = S_{25} = S_{26} = S_{27}$ = "0," and $S_{24} = Rc_2$. As a result, the signals $Cm_2$, $Cw_2$, and (MAl through MAn)$_2$ go to the CP1 by way of gates $G_{11}$, $G_{12}$ and $G_{15i}$ (*i*: 1, 2, . . . , *n*) respectively. The memory data assumes a "1" state at $S_{24}$ in the read cycle, or at $S_{14}$ in the write cycle, to allow the CP2 to read from or write to the memory of the CP1.

In the DBEX of FIGS. 8A and 8B, when $Fco$ = "1" and $SM$ = "1," then $S_{11} = S_{12}$ = "0," and $S_{21} = S_{22}$ = "1." In this state the gates $G_{11}$ and $G_{12}$ are closed, and $G_{21}$ and $G_{22}$ are opened. Accordingly, only CP2 is connected to the DBL to perform input/output operations.

The operating states of the MBEX and DBEX in the single mode are shown in FIG. 3C.

Figure 10:
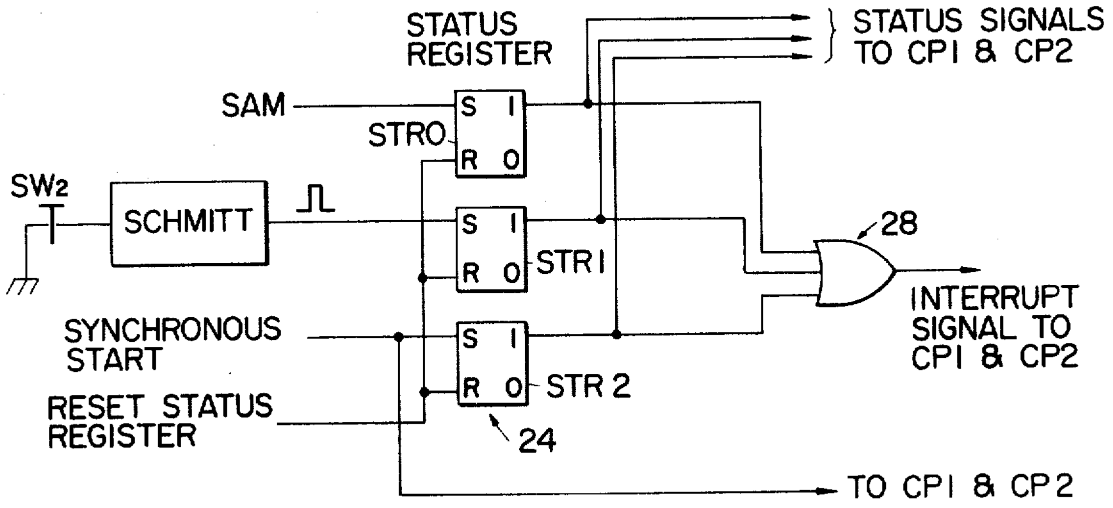
FIG. 10 is a logic diagram of status registers included in the DCU.

The single mode should manually be transferred to the preparation mode after repairing the failed CP since the time required for the repair is not constant. This manual transfer of mode is performed in the following manner. The switch SW2 of FIG. 10 is pushed to set STR1 of the DCU status register 24 to "1" whereby an interrupt is generated to the two CP's. The CP reads the contents of the status register according to the interrupt processing program (FIG. 12A). Through this step the CP becomes aware that STR1 is in a "1" state and the mode should be switched to the PM, and generates, by means of the SETPM program illustrated in FIG. 12C, a SPM pulse by the OTA instruction. As illustrated in FIG. 9B, when SPM becomes "1," the flip-flop $F_P$ is set to "1" and $F_S$ is reset to "0" whereby the mode is transferred to the PM.

Then, in accordance with the SETPM program as shown in FIG. 12C, a memory copy indicator is set in order to signal that it is appropriate to execute the memory copy program (see FIG. 12E) in the PM mode. In addition, the memory copy counter is cleared. The memory copy indicator may be comprised of a flip-flop or one bit of memory. The state of the memory copy indicator is monitored at all times by the least priority level program. When it is "1," the memory copy program is executed in the manner as described in the following section "Preparation Mode."

4. Preparation Mode

Under this mode, the memory and register contents of the failed CP (i.e., CP1 in this example) are equalized with those of the normal CP (i.e., CP2), and the two CP's are synchronized to be ready for operation under the next mode DM.

Figures 12D, 12E:
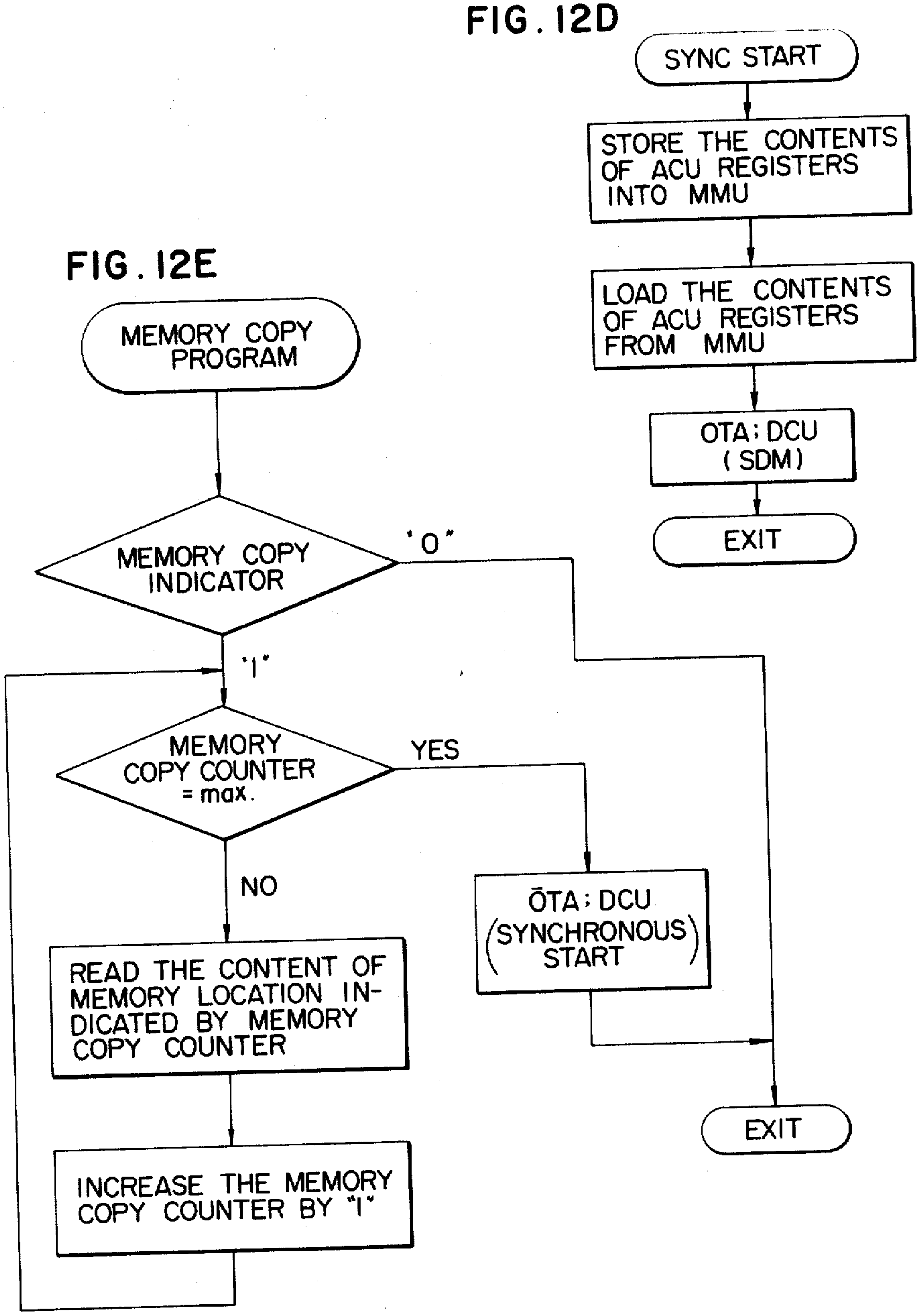

As described above in the section "Description of the MMU," when a read/write operation is performed on an address of MMU, it is necessary to perform the write operation in the write cycle (*Wc*) in the latter half of memory cycle. This write cycle also is used when the contents of the two MMU's are to be equalized. In general, a write operation is performed on an address of MMU1 each time CP2 executes a read or write operation on the corresponding address of MMU2 whereby new data is written in the memory of CP1 each time the CP2 executes in an operating program a read/write operation. In addition, the memory copy program causes CP2 to execute a read operation on its own memory (MMU1) from the first to the last addresses and the same data then are written in the two memories, MMU1 and MMU2, during the write cycle. The memory copy program, which may be in the least priority level, is shown in FIG. 12E. When the memory counter reaches the maximum value of the memory, this shows that the data are equalized in all addresses. During execution of memory equalization, the ACU of the failed CP (CP1) may remain inactive. Upon completion of the equalization of memory, the CP2 executes the OTA; DCU instruction (i.e., the output instruction to the DCU) whereby the synchronous start pulse signal is supplied to the two CP's (FIG. 4), the STR2 of the status register 24 is set to "1," and an interrupt signal is sent to the two CP's (FIG. 10). Thus the two CP's concurrently execute the interrupt processing program (FIG. 12A) and enter the synchronous start program (FIG. 12D). The viable CP2 retrieves instructions from its own memory and executes them. At the same time, CP1 executes the instruction according to the memory contents (including instructions and data) supplied from CP2.

When CP2 stores the contents of its own registers in its own memory (MMU2), the same contents are stored in the memory MMU1 at the same time. Hence, by executing an instruction for transferring the memory contents to the registers, the two CP's acquire equalized contents in their registers. The flow chart of FIG. 12D shows these steps of equalizing the contents of the registers. Upon completion of the equalization, the mode is switched to the DM by the OTA; DCU instruction, which generates an SDM signal.

In the preparation mode of operation of the MBEX of FIG. 7A, $S_{11}$ = "1" since *Fco* = "1" and *PM* = "1." Therefore $Cm_2$ is applied as a $Cm_1$ signal through $I_{21}$ and $G_{11}$. The signal $Cm_2$ also is applied as a $Cw_1$ signal through $I_{23}$ and $G_{13}$. The address signals (MAI through $MAn)_2$ are supplied to the CP1 by way of $I_{25i}$ (*i*: 1, 2, . . . , *n*) and $G_{15i}$. The data read out of the MM2 is supplied to the CP1 through $I_{24}$ and $G_{14}$. In other words, when the CP2 executes read/write operation on its own memory, the same contents are written in the MM1 and MM2. Thus memory equalization is realized.

In the DBEX of FIG 8A, the output data from CP2 is supplied to the DBL by way of elements $I_{21}$ and $G_{21}$, and the input data is supplied to the two CP's by way of elements $I_{22}$, $G_{22}$, $I_{12}$ and $G_{12}$.

FIG. 3D shows the connection states of the MBEX and DBEX in the preparation mode.

Figure 11:
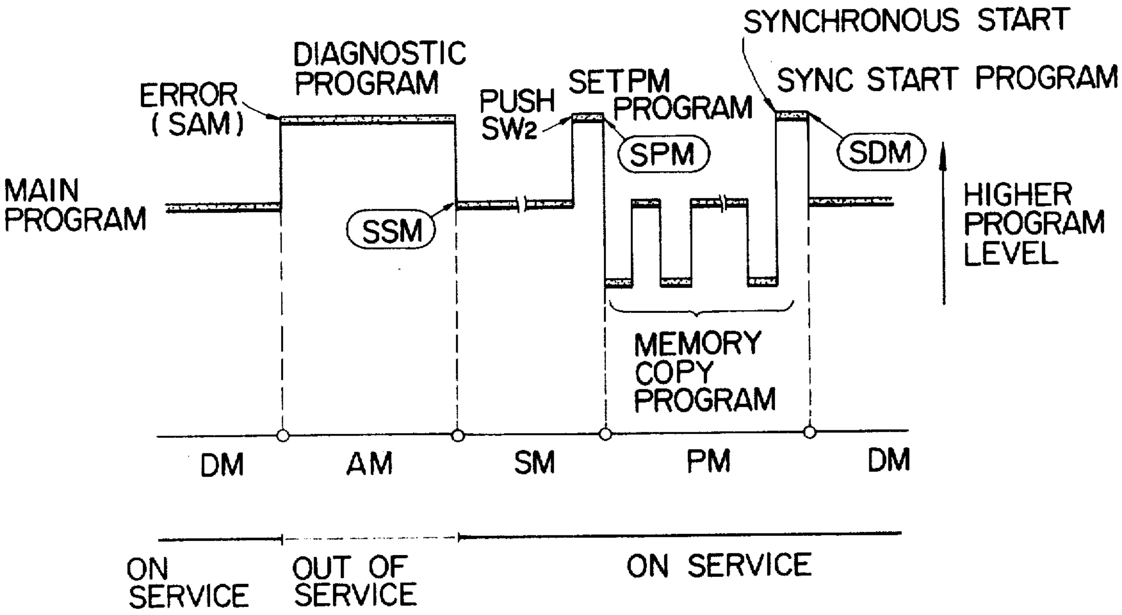
FIG. 11 is a flow diagram illustrating the various programs executed by the computers in the individual modes.

The transition of modes from DM to PM by way of AM and SM and then again to DM thus in accordance with the cyclic diagram of FIG. 2. The flow of programs executed under the individual modes is illustrated in FIG. 11. Higher priority level programs are shown above those of lower priority. As shown, the diagnostic program, SETPM program, and SYNC START program all are at a higher priority level than the main operating program, while the memory copy program is at a lower priority level. The system continues in operation except for a very short period in the abnormal mode AM, and thus the system operates with very high reliability. It should be noted that the system does not interfere with normal operation while the failed computer is restored, yet is capable of quickly restoring the failed computer to service for added reliability.

The foregoing explanation of the dual computer system has assumed that the central processor CP1 is failed. It is apparent that the same control operations will be performed in the system if the central processor CP2 fails.

As has been described in detail, the memory bus exchanger MBEX is isolated from the two CP's when the dual system is in normal operation so that in the event of failure of one of the CP's, the normal CP can remain in operation free of such ailure. This assures the two CP's will be independent of each other. If one of the CP's has failed, the memory of the failed CP can be diagnosed from the normal CP through the memory bus exchanger MBEX. The failed CP, when repaired, is returned to the dual system by simple procedures such as by reading out in sequence the addresses of the memory through the normal CP in its spare time and writing the data in the memory of the repaired computer. Hence the dual computer system of this invention is especially suited for use in computer control systems which must have high reliability.

Memory bus exchanger MBEX consists of relatively simple gate circuits and therefore its existence increases by very little the probability of failure of the system as a whole. The increase in reliability which is gained in return by facilitating the return to operation of a failed computer means that the reliability of the overall computer system can be improved. Similarly, data bus exchanger DBEX and dual control unit DCU are both constituted of relatively simple logistical circuits whose addition to the system does not serve to significantly increase the overall probability of failure.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A dual computer system for highly reliable use in industrial process instrumentation for complex processes having a number of variable process conditions such as temperature, flow rate, and the like, and arranged to receive signals representing the values of various process conditions, the store data comprising programs and base data for performing computations respecting process conditions, and to produce corresponding output signals for use in controlling the process, said dual computer system comprising:

a pair of synchronized central processors, one of which acts as a principal central processor and the other of which acts as an auxiliary central processor, each central processor comprising an arithmetic and control unit, having registers for data storage, a main memory unit for data storage, a memory bus which connects the arithmetic and control unit with the main memory unit, means for exchanging memory data signals on the memory bus between the main memory unit and the registers of the arithmetic and control unit, and input/output terminals for receiving input data signals into and transferring output data signals from the arithmetic and control unit;

input/output devices for exchanging process input/output data signals with the dual computer system;

a data bus line connecting to the input/output devices;

data bus exchange means for controlling the connections between the input/output terminals of the principal and auxiliary central processors and the data bus line;

a memory bus exchange means for controlling the connections between the memory bus of the principal central processor and the memory bus of the auxiliary central processor and thereby allowing the two central processors to exchange memory data signals; and a dual control unit supplied with the output data signals from the arithmetic and control units of the two central processors and arranged to control the data bus exchange means and memory bus exchange means, said dual control unit comprising a clock circuit for synchronizing the pair of central processors, means responsive to the output data signals from the two arithmetic and control units of the two central processors for detecting a lack of coincidence therebetween corresponding to the failure of one of the central processors, means responsive to detection of lack of coincidence between said output data signals for causing the data bus exchange means to disconnect the data bus line from both central processors, means including diagnostic programs stored in both central processors and operating upon detection of lack of coincidence between said output data signals for determining the failed central processor, means responsive to said failure determination means for causing the data bus exchange means to connect the data bus line with the input/output terminals of the normal central processor for resumption of computations respecting process conditions by the normal central processor while the failed central processor undergoes repair, means for controlling the memory bus exchange means to transfer memory data signals from the normal central processor to a repaired central processor to equalize the memory of the repaired central processor with the instantaneous memory content of the operating normal central processor, and means for starting the repaired central processor with equalized memory to cause it to operate in synchronism with the normal central processor and to cause the data bus exchange means to supply input data signals to both arithmetic and control units, whereby if a fault occurs in one of the central processors, the faulty central processor is located, repaired and restored to dual operation, and either of the two central processors is responsible for input/output operations, except for short intervals during error diagnosis, whereby the two central processors provide a very reliable and effective dual computer system for process control.

2. A dual computer system as claimed in claim 1 wherein said dual control unit further comprises a circuit for generating an interrupt signal to the two central processors, a status register to show the cause of the interrupt, and a flip-flop circuit to indicate which central processor is on service.

3. A dual computer system as claimed in claim 2 wherein said status register comprises at least three flip-flop circuits including:

a first flip-flop circuit set to a "1" state when the means for detecting lack of coincidence detects an error to instruct the two central processors to start the diagnostic program;

a second flip-flop circuit set to a "1" state through manual operation, the means for transferring memory data signals from the operating normal computer to the required computer being responsive to the setting of the second flip-flop circuit to a "1" state; and a third flip-flop circuit to instruct the synchronous start means to start for the purpose of synchronously operating the pair of central processors after completing the equalization of the memory.

4. A dual computer system as claimed in claim 1 wherein said dual control unit further comprises switch means having three positions for indicating that the system is to start in the dual mode when the switch is in one of the positions and in the single mode when in either of the other positions.

5. A dual computer system as claimed in claim 1 wherein said memory bus exchange means has means for connecting the two memory buses of the two central processors to transmit the address information, data, and write command of the operating central processor to the other central processor in unaltered form and to transmit the read command of the operating central processor to the other central processor in an altered form so as to be interpreted as a write command in the other central processor so that the other central processor may bring its memory contents into conformity with the operating central processor.

6. A dual computer system as claimed in claim 5 wherein the synchronous start means equalizes the registers of said central processors and comprises means for writing the register contents of the two arithmetic and control units into their own memory respectively, whereby the register contents of the central processor in operation is stored in both memories; and means for transferring the memory contents to the registers, whereby the register contents of the both central processors are equalized.

7. A dual computer system as claimed in claim 1 wherein said memory bus exchange means for connecting the two memory buses of the two central processors to transmit address information, data and read or write commands of the operating central processor to the failed central processor, with the most significant bit of the address information in the inverted form and the other information in normal form, whereby the operating central processor is able to retrieve and transmit data from main memory unit of the failed central processor to assist in repair thereof.

8. A dual computer system as claimed in claim 1 wherein the means for controlling the memory bus exchange means to cause memory data signals to be transferred from the memory of the normal central processor to the memory of the failed central processor comprises means for sequentially reading data in the memory addresses of the normal central processor and for writing the data into the memory of the repaired central processor.

* * * * *